Dec. 12, 1944.  B. W. OLSON  2,364,648
MULTIPLE POSITION FASTENER FOR HINGED TAIL-GATES
Filed March 24, 1943  2 Sheets-Sheet 1
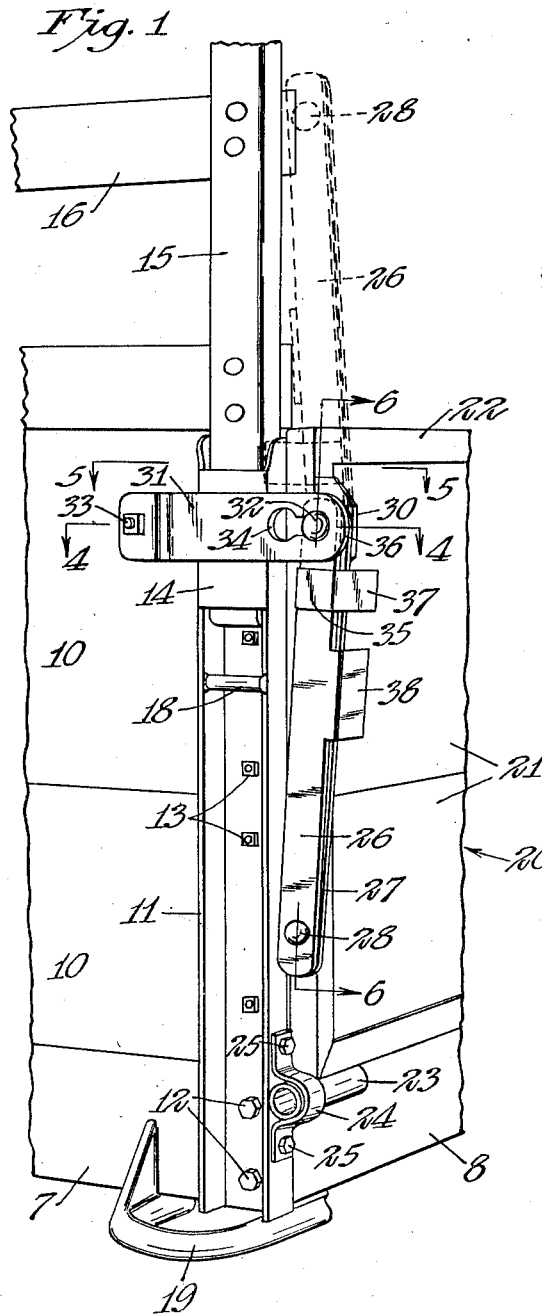
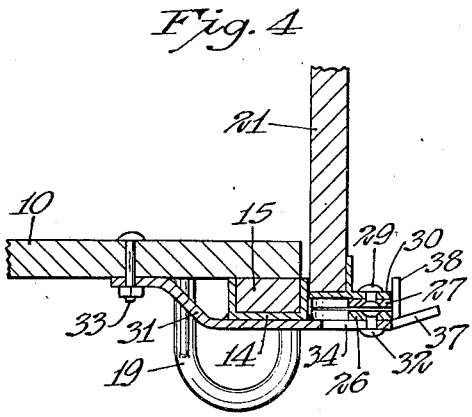
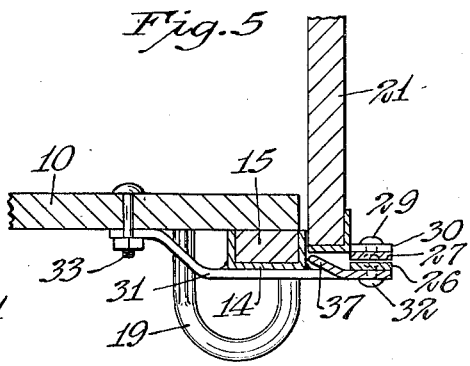
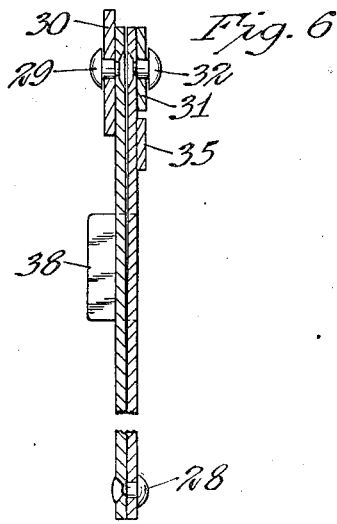
Inventor
Buford W. Olson
By Merchant & Merchant
Attorneys

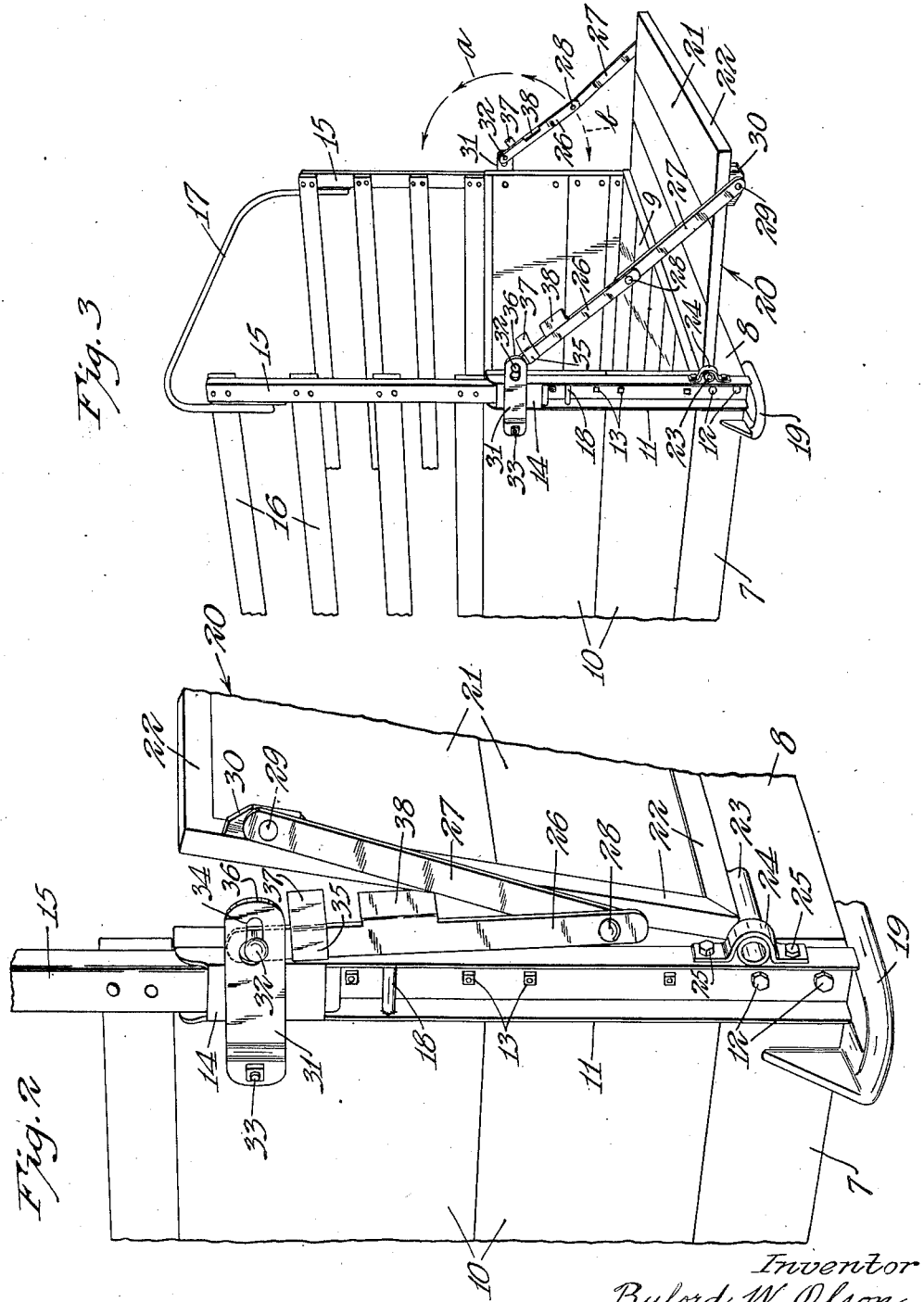

Patented Dec. 12, 1944

2,364,648

UNITED STATES PATENT OFFICE 2,364,648

MULTIPLE POSITION FASTENER FOR HINGED TAIL GATES

Buford W. Olson, Minneapolis, Minn., assignor to Chas. Olson & Sons, Inc., Minneapolis, Minn., a corporation of Minnesota Application March 24, 1943, Serial No. 480,297

6 Claims. (Cl. 296—57)

My present invention relates to multiple position fastening devices for the hinged or pivoted tail-gates of trucks, trailers, and the like.

As is well known, the so-called tail-gates of trucks, trailers, and like freight-moving vehicles, are customarily hinged to the truck or trailer body at their lower edges for pivoted movement on a horizontal axis from a vertical closed position to a vertical open position, and fastening devices (usually in the nature of link chains but sometimes in the nature of pivoted links) are provided to anchor the pivoted tail-gates in fully closed or rearwardly extended positions. Because these anchoring chains have hitherto proven to be the most satisfactory devices tried for this purpose of anchoring tail-gates in their different operative positions, such chains have been universally employed for this purpose, and this in spite of certain well-known objections thereto, among which are the following, to wit:

a. The annoying rattle set up by loose or slack portions of the chain.

b. Continuous wear on the rattling and continuously swinging free portions of the anchoring chain, resulting in wear and consequent uncertain life of the said chains.

c. The inability by means of the common chain anchoring means of drawing and holding the tail-gate tightly closed, and which results in a continuous rattle of the tail-gate and anchoring chain when the tail-gate is in a closed position, and d. The fact that fastening chains of the prior art are both difficult and slow to manipulate, and, therefore, result in a considerable loss of time.

With the above noted inherent objectionable characteristics of the prior art anchoring chain in mind, it may be said that the present invention relates to fasteners of the pivoted link variety and has among its objectives the provision of improved fastening devices for hinged tail-gates and the like which will obviate the above noted and other objectionable characteristics of the previously employed anchoring devices. In fact, and as will hereinafter be made clear, the improved fasteners or anchoring devices of the present invention are inexpensive to produce, readily installed either at the time of manufacture of the truck or trailer body or afterwards as accessories to replace common chains, are very easily manipulated, tightly and positively lock the tail-gate in closed position, will securely anchor the tail-gate in a rearwardly extended position even when great loads are placed thereon, and readily displaceable from the truck body to permit dropping of the tail-gate to a vertical, inoperative position.

The above and other highly important objects and advantages of the invention will be made apparent from the following specification, claims, and appended drawings.

In the accompanying drawings, like characters indicate like parts throughout the several views.

Referring to the drawings:

Fig. 1 is a fragmentary rear and side perspective view of a truck or trailer body having a tail-gate and equipped with fastening devices or anchors of the present invention;

Fig. 2 is a fragmentary perspective view similar to Fig. 1 but showing the tail-gate and the linkage of a fastener in position preparatory to release of the fastener from the truck body;

Fig. 3 is a perspective view similar to Figs. 1 and 2 but on a smaller scale and showing the full width of the rear end of the truck or trailer body and the tail-gate in an outwardly extended position wherein it is anchored against further downward movement by a pair of fasteners of the present invention;

Fig. 4 is a detail sectional view taken on the line 4—4 of Fig. 1;

Fig. 5 is a detail sectional view taken on the line 5—5 of Fig. 1 and showing by full lines the parts as they would appear if the pivoted arms of the fastener were moved from their full line lower position of Fig. 1 to their dotted line upper position of Fig. 1; and Fig. 6 is a detail sectional view taken on the line 6—6 of Fig. 1.

The frame of the truck or trailer body is a rectangular metallic structure composed of side member 7 and rear member 8 and may be assumed to be supported by suitable vehicle wheels, not shown, in the customary fashion. The bottom or floor boards of this body are supported directly from the frame members 7 and 8 and are indicated by 9. The sides of this body are formed by longitudinally extended side boards 10 that extend parallel to and above the side frame member 7 and are bolted or otherwise secured at their ends to upright structural members 11 adjacent the corners of the rectangular body. The body described is of the normally open stake type, but, insofar as the present invention is concerned, may be of the closed or any other type. The structural reinforcing members 11 are channel-shaped in cross section and are rigidly secured to the frame side member 7 by bolts or the like 12 and the side boards 10 are in turn secured to the structural channel members 11 by bolts, rivets, or the like 13. The upper ends of the outwardly opening channel 11 are preferably closed by flat metal plates 14 that are welded in position to form rectangular socket portions for removably receiving the ends of stakes 15, of which there may be assumed to be four, one at each corner of the body. The stakes 15 at each side of the body are connected by spaced rails 16 and the stakes at opposite sides of the body are spanned by metallic ribs 17 that are adapted to support a tarpaulin which may be thrown over the top and sides of the body to close the same and which may be held in place by suitable anchor ropes tied to short anchoring rods 18 extending between and welded to opposite flanges of the channels 11.

Anchored to the adjacent rear corner portion of the frame members 7 and 8 are step-forming elements 19 for use in climbing up into the body, and which serve also as structural supports.

The tail-gate of the box-like truck or trailer body illustrated is indicated as an entirety by 20, and is composed of wood planks 21 and a cross-sectionally channel-shaped marginal frame 22 of pressed metal or the like. This tail-gate 20 extends across the full width of the rear of the box-like body, and is horizontally hinged thereto at its bottom by tubular hinge pins 23 and cooperating hinge straps 24. The tubular hinge pins 23 are short sections of pipe which are welded to the lower edge of the tail-gate frame 22 and project into the straps 24, which straps are anchored to the structural reinforcing channel 11 by nut-equipped bolts, rivets, or the like, at 25.

The fastening devices of the present invention, and of which there is one at each side of the tail-gate 20, each comprise a cooperating pair of arms 26 and 27. These arms 26 and 27 are pivotally connected together at 28 in toggle fashion. At their ends opposite the pivot 28 the arms or bars 27 are anchored to the upper or outer edges of the tail-gate 20 by means of head-equipped studs 29 and anchoring flanges 30, the latter being welded to and projecting from the marginal tail-gate frame 22. The studs 29 are rigidly pivotally anchored to the arms 27 so as to become a fixed part thereof. The arms 26 and 27 are of substantially identical lengths and the said arms 26 are pivotally anchored to the structural element 11 of the body through the medium of anchoring brackets 31 and head-equipped studs 32. The studs 32 are rigidly anchored to the arms 26 by riveting, welding, or the like, and the said anchoring brackets 31 are preferably welded to the structural corner posts or elements 11 in addition to being bolted to a side board 10 at 33.

The head-equipped studs 32 of the arms or bars 26 work in forwardly and rearwardly extending slots 34 in the brackets 31. The rear end portions of these slots 34 are of just sufficient width to accommodate the cylindrical shank-like bodies of the studs 31, but are of insufficient width to permit displacement therethrough of the heads of said studs. The front end portions of the slots 34 are, however, enlarged to permit axial passage therethrough of the enlarged heads of the studs 32.

When the arms 26 are extended rearwardly of a vertical position, the head-equipped studs 32 are retained in the rear narrow portions of the slots 34, wherein they are locked by their heads against axial displacement from the slots, by virtue of stop elements or lugs 35 that are welded to the outer sides of the arms 26 and closely follow the rounded rear end portions 36 of the brackets 31. The rounded rear end portions 36 of the brackets 31 are semi-circular and have their axes concentric with the axes of the rounded rear ends of the slots 34, so that in materially all rearwardly extended positions of the arms 26 the portions of the stops 35 overlying the arms 26 will be engageable with the rounded rear ends 36 of the brackets to prevent material forward movement of the studs 32 from the rear ends of the slots 34. Hence, as will be seen by reference to Fig. 3, the studs 32 will be locked in the narrow rear end portions of the slots 34 when their arms 26 and 27 are in their rearwardly and downwardly extended positions assumed when the tail-gate is in its rearwardly extended substantially horizontal position. Now, for a purpose hereinafter to be made clear, the stops 35 project beyond the edges of the arms 26 in a rearward direction when said arms 26 are downwardly projected, and said projected ends, indicated by 37, are inwardly bent diagonally of the sides of said arms 26.

*Operation*

If the tail-gate 20 is in its open rearwardly extended position, as in Fig. 3, closing of the tail-gate and locking of the same in a closed position is as follows: The pivot points 28 of the arms 26 and 27 are raised slightly during the initial upward lifting action on the tail-gate 20, so that the pivot points 28 will move upwardly away from their dead center positions, after which further lifting and closing action of the tail-gate will cause the pivot points 28 of the arms 26 and 27 to move in counterclockwise direction with respect to Figs. 1, 2, and 3, and as indicated by full line arrows *a* in Fig. 3. When the tail-gate reaches a fully closed position, as shown in Fig. 1, the arms 26 and 27 will be vertically disposed and in closed parallel relation, as shown by dotted lines in Fig. 1. Now, in this upwardly extended closed position of the arms, shown by dotted lines in Fig. 1, the stops 35 are out of engagement with the rounded guide surfaces at the rear ends of the brackets 31, and which permit forward movements of the studs 32 in the slots to displaceable positions, were it not for the projected ends 37 of said stops 35. However, in these positions, movement, accidentally or otherwise, of the studs 32 to the positions wherein they are displaceable from the brackets 31 is positively prevented by engagement of the projected diagonally extending ends 37 of the stops 35 with the channel-shaped corner post 11 adjacent thereto. In other words, in upwardly extended positions of arms 26, the free ends of the diagonal portions 37 of stops 35 cooperate with the structural corner posts 11 to prevent movement of the studs 32 into their forward displaceable positions as soon as or before the portions of the stops 35 overlying the arms 26 move out of cooperative engagement with the rounded rear ends of the brackets 31. Now, to lock the tail-gate in its closed position shown in Fig. 1, the now closed and parallel pairs of arms 26 and 27 are moved downwardly and rearwardly from their dotted line positions of Fig. 1 to their full line positions of Fig. 1, and in which positions the tail-gate is locked tightly closed by virtue of stop flanges 38 carried by the arms 26 and overlying the rear edges of the arms 27 in this position of parts. The stop flanges 38 may be assumed to be welded onto the normally rear edges of the arms 26 and project over the adjacent rear edges of the now parallel arms 27, thereby serving the following dual function, to wit:

a. With the tailgate closed and the arms 26 and 27 positioned as shown by full lines in Fig. 1, the stop flanges 38 prevent outward opening movements of the arms 27 on the pivots 28 and with respect to the arms 26 and thereby lock the tailgate tightly closed, and b. When the parts are positioned as shown by full lines in Fig. 1, the said stop flanges 38 positively prevent upward or forward pivotal opening movements of the arms 26 with respect to the arms 27 on the pivots 28, and, hence, prevent the head-equipped studs 32 from being moved out of the narrow rear portions of the slots 34 and into the enlarged head-receiving forward portions of the slots 34. Obviously, of course, the stop flanges 38 are inoperative to prevent opening movements of the arms 26 and 27 on the pivots 28 when the said arms 26 and 27 are raised to their upper dotted line positions of Fig. 1.

Now, if it be desired to drop the tailgate to a depending vertical position, it will be necessary to release the arms 26 from their cooperating brackets 31, and, to accomplish this, it is merely necessary to raise the tailgate and permit the arms 26 and 27 to close pivotally in the direction indicated by dotted line arrow b in Fig. 3 and continue such movement until the tailgate 20 and arms 26 and 27 reach the positions shown by full lines in Fig. 2, wherein the stops 35 are out of engagement with the rounded rear ends 36 of the brackets 31. With the parts thus positioned, as shown in Fig. 2, the now upper ends of the arms 26 are free to be moved inwardly or forwardly to bring the heads of studs 32 into alignment with the enlarged ends of the slots 34, whereupon the heads of said studs may be moved through the slots and released from the brackets 31. Now of course, the tailgate 20 may be dropped to its lower vertical position. By reference to Fig. 2, it will be seen that the shanks of the studs will be held by gravity on the lower edges of slots 34, even when the arms are positioned forwardly, so that even in a forward position the heads will overlap the edges of the slots and prevent accidental displacement of the studs therefrom, although it is an easy matter to raise the arms to bring the stud heads into alignment with the head-receiving ends of the slots.

It should be obvious from the present disclosure that the sides, as well as the rear ends, of truck and trailer bodies may be hinged in the manner of a tailgate, and that in such event the invention hereof can readily be applied to such hinged sides. Hence, the term "tail-gate" as used herein is employed in a broad and liberal sense to include within its scope also the hinged sides of the bodies of trucks, trailers, and the like.

What I claim is:

1. The combination with a vehicle body having an opening and a hinged tail-gate for opening and closing said opening, of a multiple position fastener for said tail-gate comprising a pair of arms pivotally anchored together and being pivotally anchored, at points equally spaced from the aforesaid pivot, one to the tail-gate and one to the vehicle body adjacent the tail-gate opening, the points of pivotal anchorage of one arm to the tail-gate and the other arm to the body being substantially equally spaced from the hinge axis of the tail-gate, a stop element carried by one of the arms and projecting into the orbit of the other of said arms and located in the plane of pivotal movement of said other arm about the axis of the pivot connecting the two arms, the pivotal anchor between one of said arms and the body comprising a slotted anchoring bracket mounted on the body and a headed stud rigidly carried by the arm and working in said slot with its head overlapping the slot on the opposite side of the bracket, said slot extending in a direction inwardly and outwardly of the body opening and being narrower than said head at its outwardly extended end portion and being of sufficient width to receive the stud head at its inner end portion, and stop means carried by the last said arm and engageable with the said anchoring bracket for retaining the pivot stud in its outermost position in the slot when the said arms are extended outwardly of an approximately vertical position.

2. The combination with a vehicle body having an opening and a hinged tail-gate for opening and closing said opening, of a multiple position fastener for said tail-gate comprising a pair of arms pivotally anchored together and being pivotally anchored, at points equally spaced from the aforesaid pivot, one to the tail-gate and one to the vehicle body adjacent the tail-gate opening, the points of pivotal anchorage of one arm to the tail-gate and the other arm to the body being substantially equally spaced from the hinge axis of the tail-gate, a stop element carried by one of the arms and projecting into the orbit of the other of said arms and located in the plane of pivotal movement of said other arm about the axis of the pivot connecting the two arms, the pivotal anchor between one of said arms and the body comprising a slotted anchoring bracket mounted on the body and a headed stud rigidly carried by the arm and working in said slot with its head overlapping the slot on the opposite side of the bracket, said slot extending in a direction inwardly and outwardly of the body opening and being narrower than said head at its outwardly extended end portion and being of sufficient width to receive the stud head at its inner end portion, the outer end of said bracket being semi-circular, and a stop element carried by the cooperating arm and engageable with the rounded outer end of said bracket to retain the stud in the outer narrow portion of the slot when the arms are extended outwardly of an approximately vertical position.

3. The combination with a vehicle body having an opening and a hinged tail-gate for opening and closing said opening, of a multiple position fastener for said tail-gate comprising a pair of arms pivotally anchored together and being pivotally anchored, at points equally spaced from the aforesaid pivot, one to the tail-gate and one to the vehicle body adjacent the tail-gate opening, the points of pivotal anchorage of one arm to the tail-gate and the other arm to the body being substantially equally spaced from the hinge axis of the tail-gate, a stop element carried by one of the arms and projecting into the orbit of the other of said arms and located in the plane of pivotal movement of said other arm about the axis of the pivot connecting the two arms, the pivotal anchor between one of said arms and the body comprising a slotted anchoring bracket mounted on the body and a headed stud rigidly carried by the arm and working in said slot with its head overlapping the slot on the opposite side of the bracket, said slot extending in a direction inwardly and outwardly of the body opening and being narrower than said head at its outwardly extended end portion and being of sufficient width to receive the stud head at its inner end portion, the outer end of said bracket being semi-circular, a stop element carried by the cooperating arm and engageable with the rounded outer end of said bracket to retain the stud in the outer narrow portion of the slot when the arms are extended of an approximately vertical position, and stop means for preventing inward movement of the stud to a head displaceable position in the slot when the arms are vertically disposed and aforesaid stop element is moved out of cooperative relation with respect to the semi-circular end of the bracket.

4. The combination with a body having an opening therein and a closure therefor that is hinged to the body adjacent a horizontally disposed edge of the opening, of a multiple position fastener for said hinged closure comprising a pair of arms pivotally anchored together and being pivotally anchored, at equally spaced points from the aforesaid pivot, one to the hinged closure and the other to the body adjacent the opening, the points of pivotal anchorage of one arm to the pivoted closure and the other arm to the body being substantially equally spaced from the axis of the hinged closure, the pivotal anchor between one of said arms and the body comprising a slotted anchoring bracket mounted on the body and a headed stud rigidly carried by said arm and working in said slot with its head overlapping the edges of the slot on the opposite side of the bracket, said slot extending in a direction inwardly and outwardly of the body opening and being narrower than said head at its outwardly extending end portion and being of sufficient width to receive the stud head at its inner end portion, and stop means carried by the last said arm and engageable with the anchor bracket for retaining the pivot stud in its outermost position in the slot when the said arms are outwardly extended.

5. The structure defined in claim 4, in which the said anchoring bracket is semi-circular at its outwardly projected end portion, the axis of the semi-circular end portion being adjacent the outer narrow end of the bracket slot, and in which the said stop means lies in the plane of the bracket, and engages the semi-circular outer end of the bracket when its arm is extended outwardly from an approximately vertical position.

6. The structure defined in claim 4, in which the said anchoring bracket is semi-circular at its outwardly projected end portion, the axis of the semi-circular end portion being adjacent the outer narrow end of the bracket slot, and in which the said stop means lies in the plane of the bracket and engages the semi-circular outer end of the bracket when its arm is extended outwardly from an approximately vertical position, and another stop means carried by the last said arm and engaging the body when the said arm is in an approximately vertical upwardly projected position.

BUFORD W. OLSON.